United States Patent
Diraison et al.

(10) Patent No.: US 7,999,504 B2
(45) Date of Patent: Aug. 16, 2011

(54) ELECTRICAL POWER SUPPLY SYSTEM FOR A SATELLITE

(75) Inventors: Jean-François Diraison, Toulouse (FR); Eric Trehet, Guyancourt (FR)

(73) Assignee: Astrium SAS, Paris (FR)

(*) Notice: Subject to any disclaimer, the term of this patent is extended or adjusted under 35 U.S.C. 154(b) by 444 days.

(21) Appl. No.: 12/339,819

(22) Filed: Dec. 19, 2008

(65) Prior Publication Data

US 2009/0160397 A1     Jun. 25, 2009

(30) Foreign Application Priority Data

Dec. 19, 2007 (FR) .................................... 07 60037

(51) Int. Cl.
*H01M 10/44* (2006.01)
(52) U.S. Cl. .................................................... 320/101
(58) Field of Classification Search .................. 320/101, 320/138, 162, DIG. 33; 307/43, 44, 45, 46, 307/48, 52, 64, 65, 66; 323/906
See application file for complete search history.

(56) References Cited

U.S. PATENT DOCUMENTS

| | | | |
|---|---|---|---|
| 4,313,078 A | | 1/1982 | Bilsky et al. |
| 5,394,075 A | * | 2/1995 | Ahrens et al. ............... 320/101 |
| 5,621,300 A | | 4/1997 | Sato et al. |
| 5,869,948 A | * | 2/1999 | Becker-Irvin ................ 320/101 |
| 6,049,190 A | * | 4/2000 | Canter et al. ................ 320/101 |
| 6,157,161 A | | 12/2000 | Canter et al. |
| 6,166,515 A | * | 12/2000 | Barde et al. ................. 320/101 |
| 6,509,712 B1 | * | 1/2003 | Landis ......................... 320/101 |
| 6,744,236 B2 | * | 6/2004 | Capel et al. ................. 320/101 |

OTHER PUBLICATIONS

O'Sullivan, D: "Space Power Electronics—Design Drivers", E.S.A. Journal, ESA Publications Division, ESTEC, NL, vol. 18, No. 1, Jan. 1, 1994, pp. 1-23.
Haines, J.E., et al.: "The X-ray Mutli Mirror (XMN-Newton) Power System", Energy Conversion Engineering Conference and Exhibit, 2000 (IECEC) 35th Intersociety Jul. 24-28, 2000, Piscataway, NJ, USA, IEEE, vol. 1, Jul. 24, 2000, pp. 221-231.
INPI, French Preliminary Search Report, FR 0760037, Sep. 24, 2008.

\* cited by examiner

*Primary Examiner* — Kenneth J Whittington
(74) *Attorney, Agent, or Firm* — Patzik, Frank & Samotny Ltd.

(57) ABSTRACT

An electrical power supply system for a satellite with continuously controlled DC-voltage is suitable for recharging batteries without requiring any specific charge module. To this purpose, at least one solar generator section, so-called charge section, is connected directly to a battery output terminal (B). Simultaneously, at least one battery discharge module is dedicated to the control of a residual current that is not used for recharging the batteries. A first regulator is added to the system in order to control said residual current on the basis of a current produced by the charge section and a charge target for the batteries. Optionally, a second regulator may also be added, in order to directly control the current produced by the charge section when equipment that is electrically powered has a low consumption.

12 Claims, 2 Drawing Sheets

ELECTRICAL POWER SUPPLY SYSTEM FOR A SATELLITE

FIELD OF THE INVENTION

This invention relates to an electrical power supply system for a satellite, as well as a satellite that includes such an electrical power supply system.

BACKGROUND OF THE INVENTION

More specifically, it relates to an electrical power supply system of the continuously controlled DC-voltage type. Such system is designed to supply power to various types of equipment that consume electrical energy with a voltage that is constant, regardless of the level of this consumption and the source of energy supplied.

As it is known, and in reference to FIG. 1, such continuously controlled voltage power supply includes the following elements:
- a main power bus 11, which is intended to be connected to an equipment set 10 consuming electrical energy;
- a plurality of solar generator sections 1, which are connected to the main power bus 11;
- a battery unit 2, which has an output terminal B;
- a plurality of battery discharge regulator modules, referred to as BDR for "battery discharge regulator" and referenced 3, which are each connected between the output point B of the battery unit and the main power bus 11; and
- an error amplifier, which is suitable for producing at least one signal for controlling the current which is to be transmitted to the main power bus 11 in order to maintain the electric potential thereof constant.

The error amplifier may be of the proportional-integral regulator type. It is referred to as MEA for "main error amplifier" and referenced 4. The electric potential of the main power bus 11 is denoted by $V_{BUS}$.

Thus, the electrical power supply system includes two power sources: the solar generator sections 1, and the battery unit 2. The number of solar generator sections 1, as well as the capacity of the battery unit 2, is set according to an average electricity consumption of the equipment set 10. Each solar generator section 1 includes a DC-current generating line 1g and a switch 1s. The switch 1s is suitable for directing an electric current that is produced by the line 1g to the main power bus 11, or for inhibiting an output of this current to the bus 11. In so-called daytime operation, i.e. when the solar generator sections 1 are illuminated by the sun, they produce an electric current that is transmitted by the main power bus 11 to the equipment set 10. Possibly, if this current is insufficient with respect to the consumption of the equipment set 10, it is complemented by a discharge current from the battery unit 2, denoted by $I_{DIS}$ in FIG. 1. In nighttime operation, i.e. when the solar generator sections 1 are not producing any current, the equipment set 10 is powered only by the battery unit 2.

As an example, the constant potential $V_{BUS}$ of the main power bus 11 may be equal to 50 V (volts), and the average power consumption of the equipment set 10 may vary between 5 or 10 kW (kilowatt).

As it is known, each BDR module 3 may include a voltage converter that makes it possible to transfer an amount of current from an input of the module having an electric input potential to an output of the module having an electric output potential. This current amount is determined by a control signal that is transmitted to a control input of the module. In the system of FIG. 1, the input of each BDR module 3 is connected to the output point B and its output is connected to the main power bus 11. The input potential of the modules 3 is therefore that of the output point B of the battery unit 2, and the output potential of the modules 3 is $V_{BUS}$. The current that is transmitted by the BDR modules 3 to the main power bus 11 is then $I_{DIS} \times V_B / V_{BUS}$.

In daytime operation, the two electrical power supply modes, from the solar generator sections 1 alone or from both the latter and the battery unit 2, are controlled by the amplifier 4. To this end, the amplifier 4 compares the actual electric potential $V_{BUS}$ of the main power bus 11 to a fixed target value, which is the desired power supply potential.

When the solar generator sections 1 alone would supply a current that is too important for the consumption of the equipment set 10, the error amplifier 4 reduces the average number of solar generator sections 1, which are electrically connected to the main power bus 11, in order to prevent the potential $V_{BUS}$ thereof from exceeding the desired value. To this end, the amplifier 4 is connected to the control input of the switch 1s of each solar generator section 1, so that an average current that is transmitted by these sections can be adjusted according to the control signal produced by the amplifier. Practically, the adjustment is achieved by intermittently controlling the transmission, to the main power bus 11, of the current of some of the sections 1. The regulation of the potential $V_{BUS}$ then results from a period ratio of transmission/inhibition times. The amplifier 4 simultaneously controls a blockage of the battery discharge regulator modules 3, so that no current is supplied by the battery unit 2 ($I_{DIS}=0$).

When the current supplied by solar generator sections 1 is insufficient with respect to the consumption of the equipment set 10, the error amplifier 4 controls a transmission, to the main power bus 11 of the unit, of the current that is produced by the sections 1, and simultaneously activates the BDR modules 3. The latter then adjust the discharge current $I_{DIS}$ of the battery unit 2 so as to supply power to the equipment set 10 by keeping the electrical potential $V_{BUS}$ of the bus 11 constant. To this end, the amplifier 4 is also connected to the control input of each BDR module 3, so that the discharge current of the battery unit 2 is adjusted according to the control signal produced by the amplifier.

These two modes of adjusting the current supplied to the main power bus 11, by controlling in a variable manner the switches 1s of the solar generator sections or the BDR modules 3, may be distinguished, for example in a known manner, by the sign of the control signal which is produced by the amplifier 4.

It is understood that a capacitor connected between the main power bus 11 and a reference terminal of the system, and which is not shown, may be used to reduce residual variations of the potential $V_{BUS}$.

Finally, to recharge the battery unit 2, the system also includes at least one battery charge regulator module 7, denoted by BCR for "battery charge regulator". This module 7 is electrically connected between the main power bus 11 and the output point B of the battery unit 2. It is activated by the amplifier 4 when the solar generator sections 1 can produce a current which is higher than the consumption of the equipment set 10. The module 7 then controls a charge current, denoted by $I_{CH}$, which circulates from the bus 11, through said module 7, to the battery unit 2. This charge current is adjusted according to the charge level of the battery unit 2, according to a charge characteristic that is provided by the manufacturer of this battery unit.

However, the use of such a battery charge regulator module has the following disadvantages:

it involves increasing the weight of the satellite, which is particularly detrimental in terms of the initial costs of this latter;

it is expensive, in particular because it involves a power component, by contrast with control components; and as a voltage converter, it produces heat which must be evacuated appropriately in the satellite.

To avoid these disadvantages of battery charge regulator modules, document EP 1 073 176, which corresponds to U.S. Pat. No. 6,157,161, discloses an electrical power supply system for a satellite with continuously controlled DC-voltage, which is devoid of BCR module. In this system, certain solar generator sections are connected to the main power bus of the equipment set, and to the input of the battery unit by means of controlled switches. When one of these switches is open, so that the corresponding solar generator section is no longer connected directly to the battery unit, this solar generator section can participate in supplying power to the equipment set in the usual manner, as described above. When one of the controlled switches is closed, so as to electrically connect the corresponding solar generator section to the battery unit, the latter is recharged directly, without the charge current produced by the section passing through the main power bus. However, in such a power supply system, the charge current of the battery unit can be adjusted only by varying the number of solar generator sections that are temporarily connected to the battery unit. For this reason, this charge current cannot be finely adjusted with respect to the state of charge of the battery unit that is already achieved. This maladjustment of the charge current can reduce the lifetime of the battery unit, and therefore reduce the operating life of a satellite equipped with this power supply system.

SUMMARY OF THE INVENTION

An object of this invention is thus to avoid the disadvantages of the battery charge regulator module cited above, while enabling the charge current of the battery unit to be finely adjusted.

The invention thus proposes an electrical power supply system for a satellite of the type mentioned above, except that at least one of the solar generator sections and at least one of the battery discharge regulator modules are connected and/or controlled differently. The other solar generator sections and the other battery discharge regulator modules have implementations that are not modified.

According to the invention, at least one of the solar generator sections is connected to the output point of the battery unit, in place of the main power bus, without the intermediary of any battery discharge regulator module. Thus, the current that is transmitted by this solar generator can be transmitted directly to the battery unit in order to recharge the latter, without passing through the main power bus. The solar generator section that is thus connected is therefore dedicated as a priority to charging the battery unit. For this reason, it is referred to below as the charge section. The connections of the other solar generator sections are not modified: they are again connected to the main power bus without the intermediary of any battery discharge regulator module.

In addition, at least one of the battery discharge regulator modules is selected so as to be also dedicated to charging the battery unit. To this purpose, this BDR module is again connected between the output terminal of the battery unit and the main power bus, but its control input is no longer connected directly to the error amplifier. In place of this latter connection, the power supply system also includes a first additional regulator that is connected to the control input of the selected module. This first additional regulator is suitable for transmitting, to the selected module, a signal for adjusting a residual current that corresponds to an excess of the current produced by the charge section with respect to a charge target of the battery unit. The charge target may be programmed according to the state of charge of the battery that is already achieved. The residual current is retransmitted to the main power bus, so that it participates in supplying power to the equipment set.

Moreover, the error amplifier is also connected to the first additional regulator in order to activate an operation of the latter. The error amplifier then advantageously operates in the same way as when it controls the operation of a battery discharge regulator module for a power supply system according to FIG. 1, when the power that is provided by the solar generator sections is not sufficient to supply power to the equipment set consuming electrical energy. Thus, a charge of the battery unit can be performed from the charge section while certain solar generator sections other than this charge section transmit, to the main power bus, a current that, together with the residual current, supplies power to the equipment set.

The invention therefore consists in assigning one or more solar generator sections as a priority for the recharging of the battery unit. To this purpose, this section or these sections is (are) connected directly to the output terminal of the battery unit, instead of being connected directly to the main power bus. One or more battery discharge regulator module(s) is (are) simultaneously dedicated to the charging of the battery unit. To this end, it (they) is (are) controlled by the first additional regulator instead of being controlled directly by the error amplifier.

The invention enables the battery unit to be recharged without requiring a battery charge regulator module. To this purpose, the adjustment of a charge current by a BCR module is replaced by the adjustment of the residual current by the selected BDR module. The electrical power supply system can therefore be devoid of any BCR module. The mode of charging the battery unit then obtained is called "charge-by-diversion" by the inventors.

In addition, to supply power to the same equipment set, the invention does not require adding any additional solar generator section, or any additional discharge regulator module. The number of these power components is therefore constant, while having removed any battery charge regulator module from the system. Given that the first additional regulator that is added to the power supply system according to the invention is only an integrated electronic control circuit, it is light and inexpensive. The weight and the cost of the overall electrical power supply system are therefore reduced by the invention.

Actually, the invention involves a better use of the current that is produced by the solar generator sections, when this current is higher than the consumption of the equipment set. The charge section(s) then recharge not only the battery unit, but simultaneously produce the residual current that is used by the equipment set, at the same time as the current that is produced by the other solar generator sections, of which the implementation is not modified.

In addition, the assignment of one or more battery discharge regulator module(s) to the charging of the battery unit enables the charge current to be finely adjusted.

A first improvement of the invention may be provided so as to enable the battery unit to be recharged when the transmission, to the main power bus, of a residual current is not compatible with the current required to supply power to the equipment set. This situation of incompatibility corresponds to a residual current supplied by the battery discharge regulator module(s) dedicated to the charging of the battery unit according to the invention, which is higher than the current consumed by the equipment set. To this end, the system may also include a second additional regulator that is connected to the control input of the switch(es) of the charge section(s). This second additional regulator is selected only when the charge-by-diversion mode is not compatible with the consumption of the equipment set. It is then suitable for controlling a direct adjustment of the current that is transmitted by the charge section(s) to the output terminal of the battery unit. The adjustment then consists in reducing, by modifying the period ratio of the switch(es) of the charge section(s), the current that is transmitted by them so that the charge target is met.

A second improvement of the invention is more specifically provided for a fairly long period during which the battery unit is unused. In this case, it may be advantageous to isolate the battery unit from the charge section(s). To this purpose, the power supply system may also include an equinox switch that is connected between the charge section(s) and the output terminal of the battery unit. This equinox switch makes it possible to connect electronically the charge section(s) to the main power bus, instead of this (these) section(s) being connected to the output terminal of the battery unit.

Optionally, the first and second additional regulators may also be adapted so that, when the equinox switch electrically connects the charge section to the main power bus and when the second additional regulator is selected after inhibition of the first one, there is an interval of adjustment for the charge target, in which the first regulator controls a cancellation of the current which is retransmitted to the main power bus by the discharge regulator module(s) selected, and the second regulator simultaneously controls a cancellation of the current which is transmitted by the charge section(s) to the main power bus when this second regulator is selected after inhibition of the first regulator. In this way, only the solar generator sections other than the charge section(s) are then operational. Any conflict concerning the regulation of the electric potential of the main power bus is thus avoided.

The invention also proposes a satellite that includes an electrical power supply system as described above. This may be in particular a geostationary satellite.

BRIEF DESCRIPTION OF THE DRAWINGS

Other special features and advantages of this invention will appear in the following description of a non-limiting example embodiment, in reference to the appended drawings, in which.

DETAILED DESCRIPTION OF THE INVENTION

Figure 1:
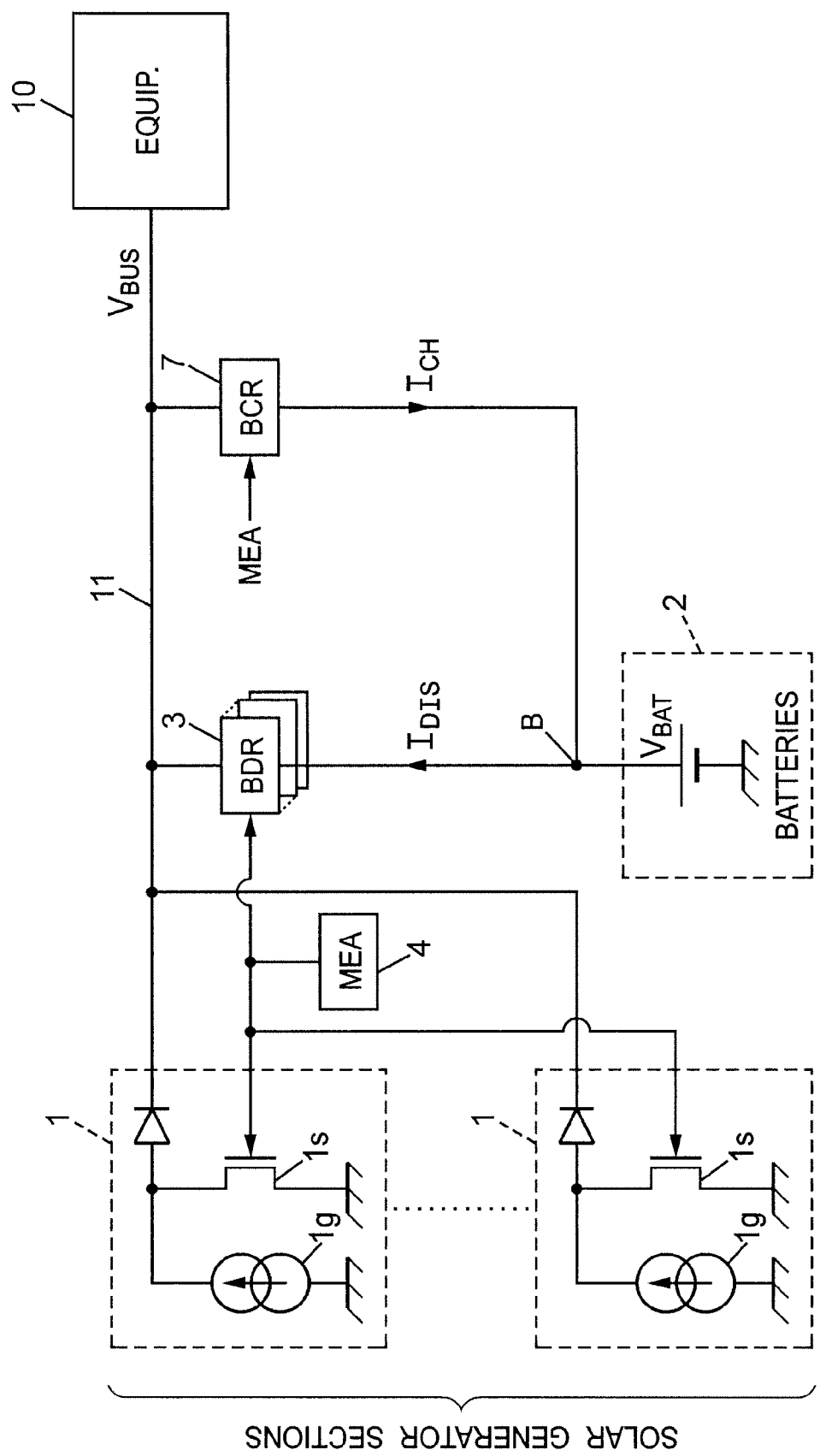
FIG. 1 is a block diagram of an electrical power supply system for a satellite, with continuously controlled voltage, as known from the prior art.

FIG. 1 has already been described above in detail, along with the operation of the corresponding electrical power supply system.

Figure 2:
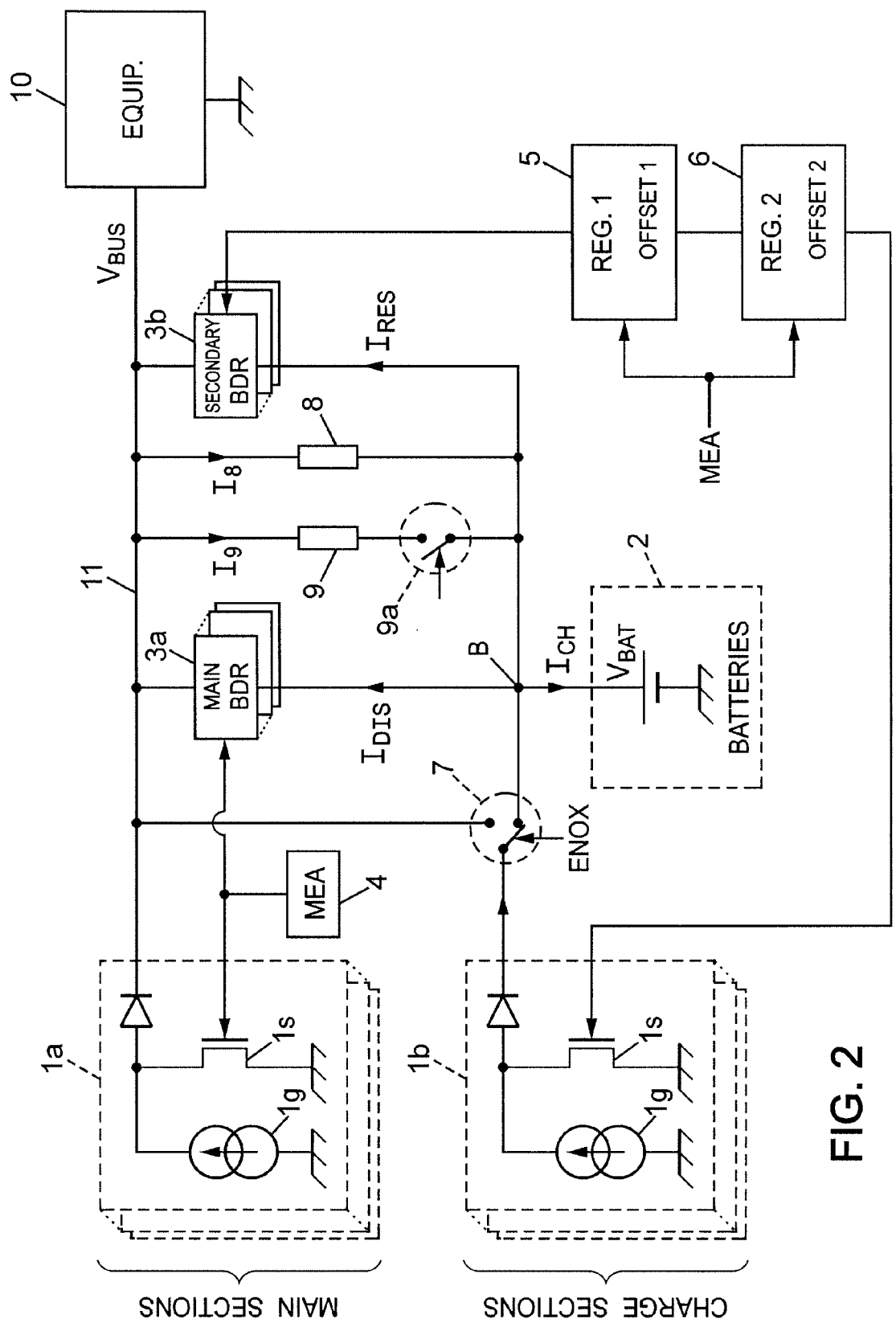
FIG. 2 is a block diagram of an electrical power supply system for a satellite, with continuously controlled voltage, according to this invention.

The system of FIG. 2 is now described in detail, for the parts of it that differ from the system of FIG. 1 and that show the invention and/or improvements thereof. The components of the system of FIG. 2 with the same reference numbers as those of the components of FIG. 1 are identical to the latter, and have an identical function. For this reason, they are not described again.

The electrical power supply system of FIG. 2 is again of the continuously controlled supply voltage type. This voltage may be of any value, for example 18 V, 42.5 V, 50 V or even 100 V. The constant electric potential $V_{BUS}$ of the main power bus 11 that corresponds to this voltage is measured with respect to a reference terminal of the batteries 2. On-board a satellite, this reference terminal may be connected to the ground of the satellite.

According to the charge-by-diversion principle of the invention, the solar generator sections are divided into two groups as follows, depending on their respective connections to the main power bus 11 and, optionally, their control mode.

A first group of solar generator sections, which are called main sections and referenced 1a, is dedicated to supplying power to equipment 10 via the main power bus 11. These sections 1a are connected directly to the bus 11 and controlled by the error amplifier 4 as described in reference to FIG. 1. "Main sections 1a connected directly to the bus 11" means an electrical connection between these components that does not incorporate any battery charge/discharge regulator module.

A second group of solar generator sections, which are called charge sections and referenced 1b, is dedicated to recharging the batteries 2. The charge sections 1b are connected directly to the output terminal B of the batteries 2, so that a current which is produced by the charge sections 1b is transmitted to the terminal B when the output of this current is not inhibited by the switches 1s inside these sections. The inventors specify that the charge sections 1b do not undergo any modification or adaptation with respect to the main sections 1a, and are distinguished from the latter only by their connection mode and their control mode within the power supply system. "Charge sections 1b connected directly to the terminal B" means an electrical connection between these components that does not incorporate any battery charge/discharge regulator module.

For example, the number of main sections 1a may be twenty-four or forty-eight, and the number of charge sections 1b may be one to four.

Optionally, the charge sections 1b may be connected to the terminal B by means of a switch 7, the function of which will be explained later. For the sake of clarity in the remainder of the description, we will first assume that the switch 7 electrically connects the charge sections 1b to the terminal B, until otherwise indicated.

The battery discharge regulator modules, or BDR, are all connected between the terminal B and the main power bus 11, so as each to conduct a positive current that circulates from the terminal B to the bus 11. According to the invention, they are also divided into two groups, according to their control mode.

A first group of BDR modules, called main modules and referenced 3a, is dedicated to supplying power to the equipment 10 from the batteries 2. The batteries 2 can thus supply a current to the equipment 10 for the entire consumption of the latter, or in addition to a current supplied by the solar generator sections. A battery discharge current 2, denoted by $I_{DIS}$, then circulates from the terminal B to the bus 11, through the main modules 3a. These modules 3a are controlled by the error amplifier 4 in order to maintain the potential $V_{BUS}$ constant, as already described in reference to FIG. 1. The power supply system of the invention therefore has a night-time operation, using the main BDR modules 3a, which is identical to that of the system of FIG. 1.

BDR modules of a second group, called secondary modules and referenced 3b, are dedicated to controlling the recharging of the batteries 2 in daytime operation. To this purpose, a control input of the secondary modules 3b is connected to an output of a first additional regulator, referenced 5 and denoted by REG. 1. This second group of BDR modules can also be used together with the first group of BDR modules in order to supply power to the equipment 10 from the batteries 2.

In daytime operation, when the main sections 1a are sufficient for supplying power to the equipment 10, then $I_{DIS}=0$ and the secondary modules 3b control the current $I_{RES}=I_{1B}-I_{CH}$, where $I_{1B}$ is the current produced by the charge sections 1b and $I_{CH}$ is the current required for charging the batteries 2, which enters them by the terminal B. The current $I_{RES}$, so-called residual current, is retransmitted by the secondary modules 3b to the main power bus 11. It thus participates in supplying power to the equipment 10, with the current that is produced by the main sections 1a. The regulator 5 calculates a set point for adjustment of the current $I_{RES}$ on the basis of a measurement of the current $I_{1B}$ and a battery charge current target, then transmits the set point of the current $I_{RES}$ to the secondary modules 3b. The charge current target itself may depend on the state of charge of the batteries 2 that is already achieved, in which case the regulator 5 may also be connected in order to receive a characterization signal of this state of charge.

In nighttime operation, when the main sections 1a are not sufficient for supplying power to the equipment 10, the secondary modules 3b are controlled in the same way as the main modules 3a in order to optimize the complete system.

For example, there may be twelve main modules 3a, and there may be from one to four secondary modules 3a dedicated to charging the batteries 2. Owing to this use of BDR modules for adjusting the $I_{RES}$ current, the $I_{CH}$ current may itself be adjusted with sufficient precision. Optimal operation of the batteries 2 can thus be maintained over a long period.

Preferably, in order to optimize a use of the electric power available, a current production by the charge section(s) 1b may be controlled as a priority with respect to a current production by the main sections 1a, which would be increased. This in particular enables the state of charge of the batteries 2 to be ensured.

The regulator 5 is itself activated by the amplifier 4 by means of a specific control line. In this way, the battery charge-by-diversion mode described above is activated only when all of the solar generator sections 1a and 1b are sufficient for supplying power to the equipment 10. The amplifier 4 then controls a blocking of the main modules 3a, so that the batteries do not produce any discharge current ($I_{DIS}=0$).

A second additional regulator 6, which is denoted by REG. 2 in FIG. 2, may also be provided in order to suppress, if necessary, the current $I_{RES}$ that is produced by the charge-by-diversion mode. This may be useful when the equipment 10 has low consumption and the batteries 2 are almost or fully recharged. In this case, the current $I_{RES}$ of the daytime operation described above might be excessive with respect to the consumption of the equipment 10, causing a power surge. The main 3a and secondary 3b BDR modules are then blocked ($I_{DIS}=0$). The regulator 6 is authorized by the amplifier 4, and generates a control signal for the switching period ratio of the switches 1s of the charge sections 1b, so that these sections directly produce a current conforming to the charge target of the batteries 2. Consequently, the current $I_{RES}$ is suppressed. In this way, the potential $V_{BUS}$ of the main power bus 11 is again maintained constant.

The switch 7 has an input that is connected to the charge sections 1b, and two outputs that are connected respectively to the main power bus 11 and to the output terminal B of the batteries 2. An external signal, designated ENOX, enables the state of the switch 7 to be controlled so that its input is put in electrical contact with one or the other of its two outputs. In this way, the charge sections 1b can be connected to the terminal B for the operations of the power system described above. Alternatively, they can be connected by the switch 7 directly to the main power bus 11, without the intermediary of BDR modules.

The electrical isolation that can thus be produced, between the charge sections 1b and the batteries 2, is advantageous in particular when the batteries are not used for a long period. It enables a reduction in the discharge of the batteries 2 via leakage currents of the power supply system. It is even more advantageous when the maximum electric output potential of the batteries 2 is below the power supply potential $V_{BUS}$. Indeed, the solar generator sections 1a and 1b are sized so as to have, at the output, the potential value $V_{BUS}$, and the maintaining of the charge sections at the potential of the output terminal B causes their power capacity to become reduced. Thus, when the batteries 2 are necessary for supplying power to the equipment 10 or must be recharged, the switch 7 is controlled in order to connect the charge sections 1b to the output terminal B. Outside of such periods, the switch 7 is advantageously controlled in order to connect the charge sections 1b to the main power bus 11. In this way, a higher available electric power is supplied by all of the solar generator sections.

When the power supply system of FIG. 2 is installed onboard a geostationary satellite, the batteries 2 are essentially unnecessary during first long periods around summer and winter solstices, and are necessary for second shorter periods around the vernal and autumnal equinoxes. The switch 7 can then be controlled in order to electrically connect the charge sections 1b to the bus 11 for the first periods, and to the terminal B for the second periods. For this reason, the switch 7 is called an "equinox switch" in this patent application. It is understood that this is term established only for a particular use of a system according to the invention, and that the invention may be used on non-geostationary satellites, as well as on any other type of spacecrafts with on-board electrical power supply.

In the particular embodiment of the invention described above, a conflict in the regulation of the potential $V_{BUS}$ may appear when the switch 7 electrically connects the charge sections 1b directly to the main power bus 11. Indeed, the additional regulator 6 does not enable these sections to be controlled on the basis of the electric potential of the main power bus. It is therefore not suitable for operating when the electric consumption required by the equipment 10 is low.

To avoid such a conflict, according to an improvement of the invention that is particularly economical, the regulators 5 and 6, which are used respectively for the charge-by-diversion mode and when the charge-by-diversion mode is incompatible with the current required by the equipment, may have two respective offsets that are initially set. These offsets are adapted so that when the control signal produced by the amplifier 4 and transmitted to the regulators 5 and 6 is intermediate between the two offsets, then the regulator 5 controls a cancellation of the current which is retransmitted to the bus 11 by the secondary BDR modules 3b, i.e. $I_{RES}=0$, and the regulator 6, if it is selected, controls a cancellation of the current which is transmitted by the charge sections 1b to the main power bus 11, i.e. $I_{1b}=0$. These offsets of the regulators 5 and 6 are respectively designated OFFSET 1 and OFFSET

2. For example, the regulator 5 controls a current $I_{RES}$ that is not zero when the control signal produced by the amplifier 4 is greater than OFFSET 1, and the regulator 6 controls the effective output of the current produced by the charge sections 1*b* when the control signal of the amplifier 4 is below OFFSET 2. By setting OFFSET 1 at a level above that of OFFSET 2, the interval between these two offsets corresponds to an adjustment of the charge target according to which the secondary BDR modules 3*b* are blocked, and the output of the current $I_{1b}$ from the charge sections 1*b*, to the main power bus 11, is inhibited if the regulator 6 is selected. Under conditions of low consumption of the equipment 10, the equipment is then powered only by the main sections 1*a*. Such mode of operation, which is activated when the equinox switch 7 electrically connects the charge sections 1*b* to the main power bus 11 and when the charge target is intermediate between OFFSET 1 and OFFSET 2, is called "solstice operation mode" by the inventors. Of course, this term does not restrict the use of such operation mode for the system to the implementation on-board a geostationary satellite, or to a solstice period.

An additional improvement of the invention enables the batteries 2 to be continuously recharged when the electric potential $V_{BUS}$ of the main power bus 11 is greater than the maximum output potential of the batteries 2. Indeed, it is possible for the batteries 2 to be subjected to a slow discharge. Such a discharge may have causes internal to the batteries 2. A person skilled in the art then refers to the self-discharge of the batteries 2, by contrast with discharge causes external to the batteries 2, such as leakage currents present in the electrical power supply system or in the equipment 10. To this purpose, the system may also include a first electric resistance unit 8, which is connected between the main power bus 11 and the output terminal B of the batteries 2. This first resistance unit 8 is suitable for enabling the batteries 2 to be continuously recharged by a first current that circulates through the unit 8. This first current is designated 18 in FIG. 2, and circulates from the bus 11 to the output terminal B. For example, the unit 8 may have a resistance value of several kilohms. For a geostationary satellite, it may make it possible to avoid having to recharge the battery unit for around four-and-a-half months around summer and winter solstices.

A second electric resistance unit 9 may also be connected between the main power bus 11 and the output terminal B, temporarily, again when the electric potential $V_{BUS}$ of the main power bus 11 is greater than the maximum output potential of the batteries 2. To this purpose, the resistance unit 9 may be connected in series with a controlled switch 9*a*. Thus, in daytime operation and when the consumption of the equipment 10 requires momentary use of the batteries 2, it is then possible to close the switch 9*a* in order to create an additional path for recharging the batteries 2, from the main power bus 11 via the resistance unit 9. For example, the resistance unit 9 may have a resistance value of several hundred ohms. A recharge of the batteries 2 can thus be performed for a limited time, without disconnecting the charge sections from the main power bus.

The invention claimed is:

1. Electrical power supply system for satellite, with continuously controlled DC-voltage, including:
   a main power bus intended to be connected to an equipment set consuming electrical energy;
   a plurality of solar generator sections connected to the main power bus;
   a battery unit, which has an output terminal (B);
   a plurality of battery discharge regulator modules, each connected between the output point (B) of the battery unit and the main power bus; and
   an error amplifier, suitable for producing at least one control signal of at least one current transmitted to the main power bus in order to maintain an electric potential ($V_{BUS}$) of said main power bus constant,
   wherein each solar generator section includes a DC-current generating line and a switch, suitable for transmitting an electric current produced by said line to the main power bus, or for inhibiting an output of said current to said main power bus,
   the error amplifier is connected to a control input of the switch of at least some of the solar generator sections, so that an average current transmitted by said sections can be adjusted according to the control signal produced by the error amplifier, and
   the error amplifier is also connected to a control input of at least some of the battery discharge regulator modules, so that a discharge current ($I_{DIS}$) of the battery unit can be adjusted according to the control signal produced by the error amplifier,
   which electrical power supply system includes:
   at least one of the solar generator sections, so-called charge section, is connected to the output point of the battery unit without the intermediary of any battery discharge regulator module, so that a portion of the current transmitted by said charge section can be transmitted directly to the battery unit without passing through the main power bus,
   in which the solar generator sections other than said charge section are connected to the main power bus without the intermediary of a battery discharge regulator module, the power supply system also includes a first additional regulator connected to the control input of at least one module selected from the battery discharge regulator modules, with said first additional regulator being suitable for transmitting, to said selected module, a signal for adjusting a residual current corresponding to an excess of the current produced by the charge section with respect to a charge target for the battery unit, and said residual current being retransmitted to the main power bus,
   and in which the error amplifier is further connected to the first additional regulator in order to activate an operation of said first additional regulator so that a charge of the battery unit can be produced from the charge section while some of the solar generator sections other than said charge section transmit, to the main power bus, a current that, with said residual current, supplies power to the equipment set.

2. The system according to claim 1, further comprising a second additional regulator connected to the control input of the switch of the charge section, in which said second regulator is suitable for controlling an adjustment of the current transmitted by said charge section to the output terminal of the battery unit so that said charge section directly produces a current in accordance with the charge target of the battery unit, when a charge of said battery unit controlled by the first additional regulator, with the retransmission of the residual current to the main power bus, is not compatible with the current consumed by the equipment set.

3. The system according to claim 1 or 2, further comprising an equinox switch, this latter having an input and two outputs suitable for being put in electrical contact with said input, alternately depending on an external control signal, in which the charge section is connected to the input of said equinox switch on one hand, and the output terminal of the battery unit and the main power bus are respectively connected to the two outputs of said equinox switch on the other hand.

4. A satellite including an electric power supply system according to claim 3.

5. The system according to claim 2 further comprising an equinox switch, this latter having an input and two outputs suitable for being put in electrical contact with said input, alternately depending on an external control signal, in which the charge section is connected to the input of said equinox switch on one hand, and the output terminal of the battery unit and the main power bus are respectively connected to the two outputs of said equinox switch on the other hand, in which the first and second additional regulators are adapted so that when the equinox switch electrically connects the charge section to the main power bus, there is a solstice operation mode for said electrical power supply system where said first additional regulator controls a cancellation of the current retransmitted to the main power bus by the discharge regulator module(s) selected, and said second additional regulator controls, if said second additional regulator is selected, a cancellation of the current transmitted by the charge section(s) to the main power bus.

6. The system according to claim 5, in which the first and second additional regulators have two respective set offsets, adapted so that said solstice operation mode is activated when the charge target transmitted to said first and second additional regulators is intermediate between said offsets.

7. The system according to any one of claims 1, 2, 5 and 6, in which the electric potential of the main power bus ($V_{BUS}$) is higher than a maximum electric output potential of the battery unit, said system also includes a first electric resistance unit connected between the main power bus and the output terminal of the battery unit, and said first resistance unit is suitable for continuously recharging said battery unit by a first current circulating through said first resistance unit.

8. The system according to claim 7, in which the electric potential of the main power bus ($V_{BUS}$) is higher than a maximum electric output potential of the battery unit, said system also includes a second electric resistance unit and a controlled switch arranged so as to temporarily connect said second resistance unit between the main power bus and the output terminal of the battery unit, and suitable for recharging said battery unit by a second current circulating through said second resistance unit, in which said first resistance unit has a first resistance value higher than a second resistance value of said second resistance unit.

9. A satellite including an electric power supply system according claim 8.

10. The system according to claim 1, 2, 5 or 6, in which the electric potential of the main power bus ($V_{BUS}$) is higher than a maximum electric output potential of the battery unit, said system also includes a second electric resistance unit and a controlled switch arranged so as to temporarily connect said second resistance unit between the main power bus and the output terminal of the battery unit, and suitable for recharging said battery unit by a second current circulating through said second resistance unit.

11. A satellite including an electric power supply system according to any one of claims 1, 2, 5 and 6.

12. The satellite according to claim 11, wherein the satellite is of the geostationary type.

* * * * *